June 9, 1953     C. O. BRUESTLE     2,641,413
CABLE REEL TAKE-UP

Filed Jan. 20, 1947     6 Sheets-Sheet 1

INVENTOR
CARL O. BRUESTLE
BY Darby & Darby
ATTORNEYS,

June 9, 1953   C. O. BRUESTLE   2,641,413
CABLE REEL TAKE-UP
Filed Jan. 20, 1947   6 Sheets-Sheet 2

INVENTOR
CARL O. BRUESTLE
BY Darby & Darby
ATTORNEYS,

June 9, 1953 — C. O. BRUESTLE — 2,641,413
CABLE REEL TAKE-UP
Filed Jan. 20, 1947 — 6 Sheets-Sheet 5

INVENTOR
CARL O. BRUESTLE
BY Darby & Darby
ATTORNEYS.

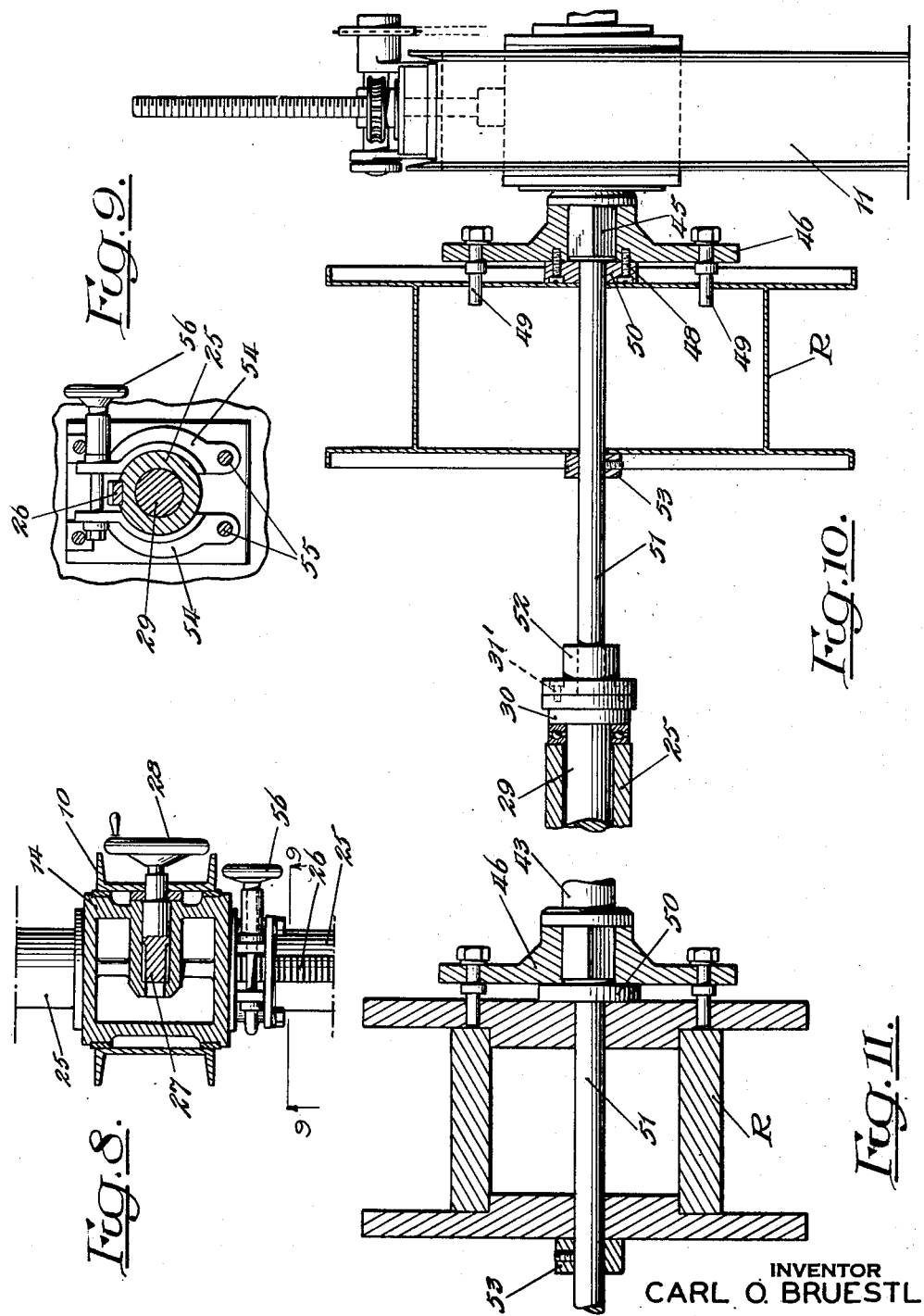

Patented June 9, 1953

2,641,413

UNITED STATES PATENT OFFICE 2,641,413

CABLE REEL TAKE-UP

Carl O. Bruestle, Rahway, N. J., assignor to Syncro Machine Company, Perth Amboy, N. J., a corporation of New Jersey Application January 20, 1947, Serial No. 723,144

5 Claims. (Cl. 242—54)

This invention relates to improvements in cable reel take-up machines.

The invention is concerned with improvements of simplification and cost reduction in manufacture, and ease of manipulation in use of a cable reel take-up machine.

In the processing and manufacture of cables of various types, and particularly of the heavier types such as stranded steel cables, electrical cables and the like, it is common to provide a machine for supporting the take-up reel upon which the processed or manufactured cable is wound. For the larger cable sizes the cable reels are massive and heavy, and when loaded are extremely heavy.

The machine of this invention is of the type with which it is not necessary to use a reel arbor, although for certain narrow reels the mechanism as disclosed herein is adapted to use a light arbor. This arborless type of machine provides a pair of stub shafts or pintles supported in spaced axial alignment for vertical adjustment to facilitate handling of reels of various widths and diameters. These stub shafts or pintles are also arranged so as to be axially varied in spacing to accommodate reels of various axial lengths. Associated with one of the stub shafts is a novel form of detachable reel engaging dog supporting structure through which rotation of the reel is effected.

Another feature of the invention is concerned with a novel form of power transmission for effecting rotation of the driving dogs wherein adjustment for various reel sizes can be made without disturbing the power transmission.

Other and more detailed improvements comprising part of the invention will be apparent from the following disclosure of the embodiment thereof disclosed in the attached drawings employed for illustrating the novel subject matter hereof and including attachments for permitting the use of an arbor where narrow take-up reels are used.

This invention resides substantially in the combination, construction, arrangement and relative location of parts as will be described in detail below.

In the accompanying drawings,

Figure 8 is a horizontal, cross-sectional view of the same mechanism taken along the line 8—8 in Figure 7;

Figure 9 is a transverse sectional view taken along the line 9—9 in Figure 8 showing a locking means for the shaft which supports the lefthand stub shaft;

Figure 10 is a longitudinal, detailed, cross-sectional view of the modification employing an arbor for narrow metal reels with many parts broken away; and Figure 11 is a similar view showing a part of the same mechanism employed with a wooden reel.

Figure 1:
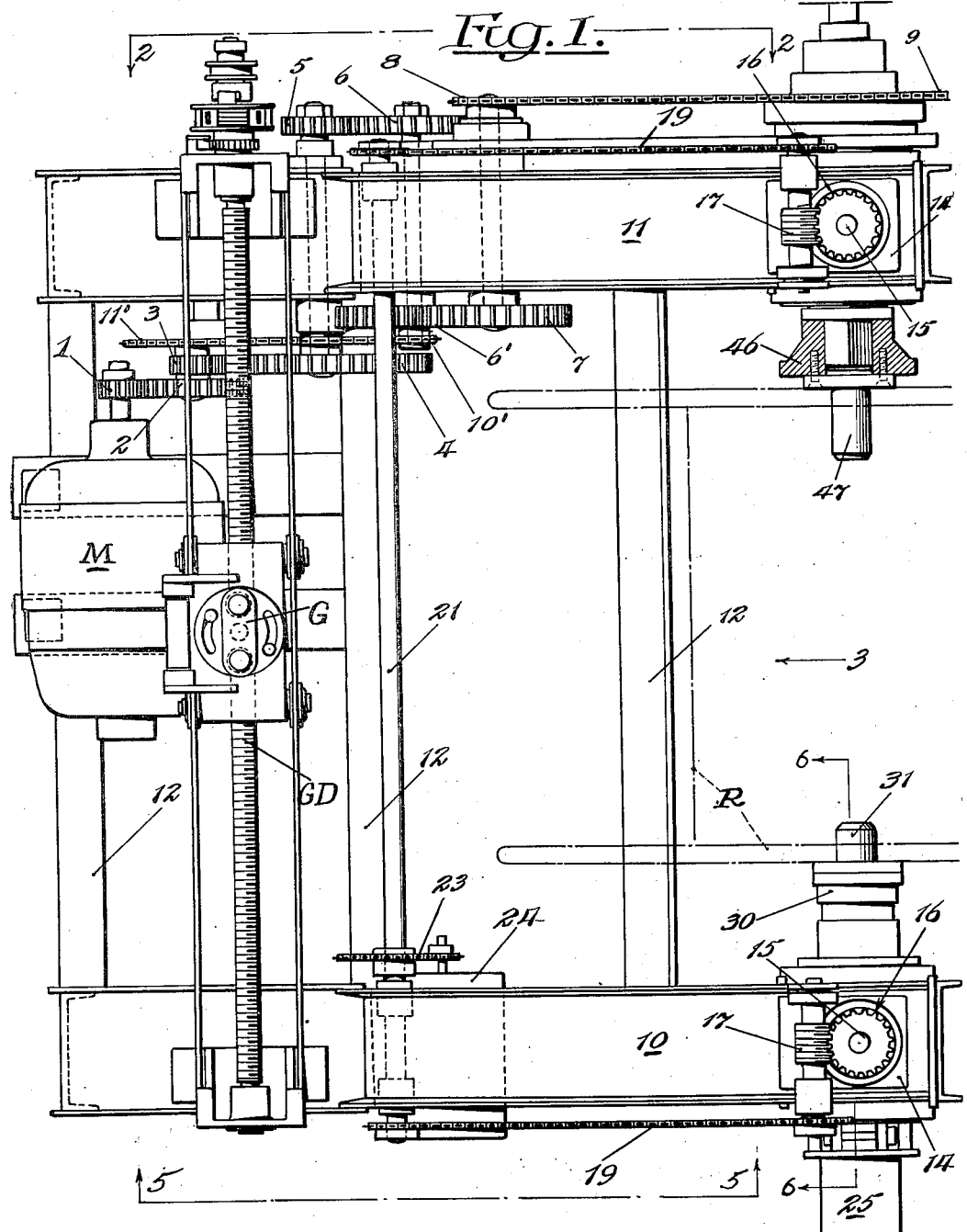
Figure 1 is a top plan view of a cable reel take-up mechanism in accordance with this invention.
Figure 2:
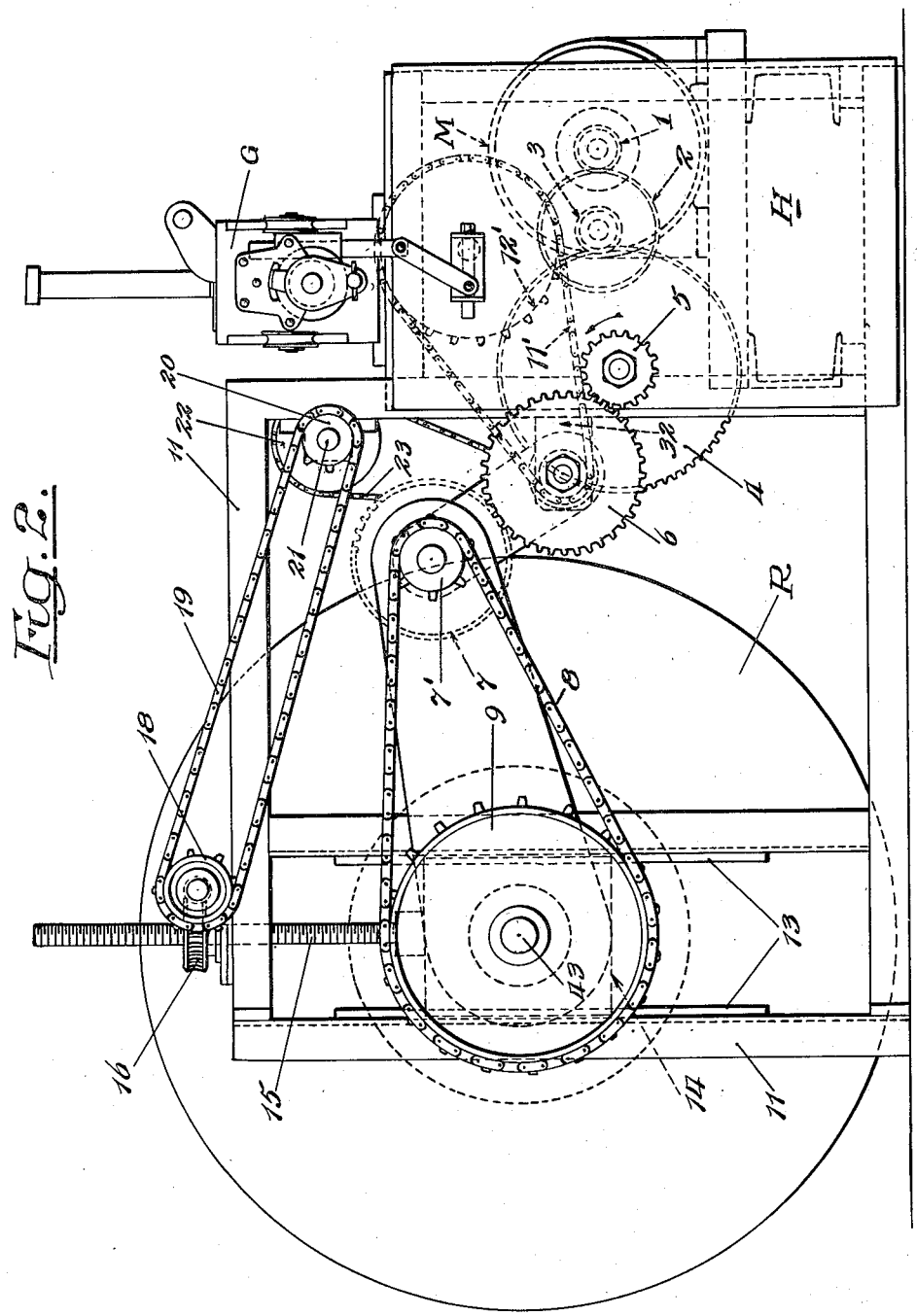
Figure 2 is a righthand side elevational view of this mechanism taken on line 2—2 of Figure 1.
Figure 3:
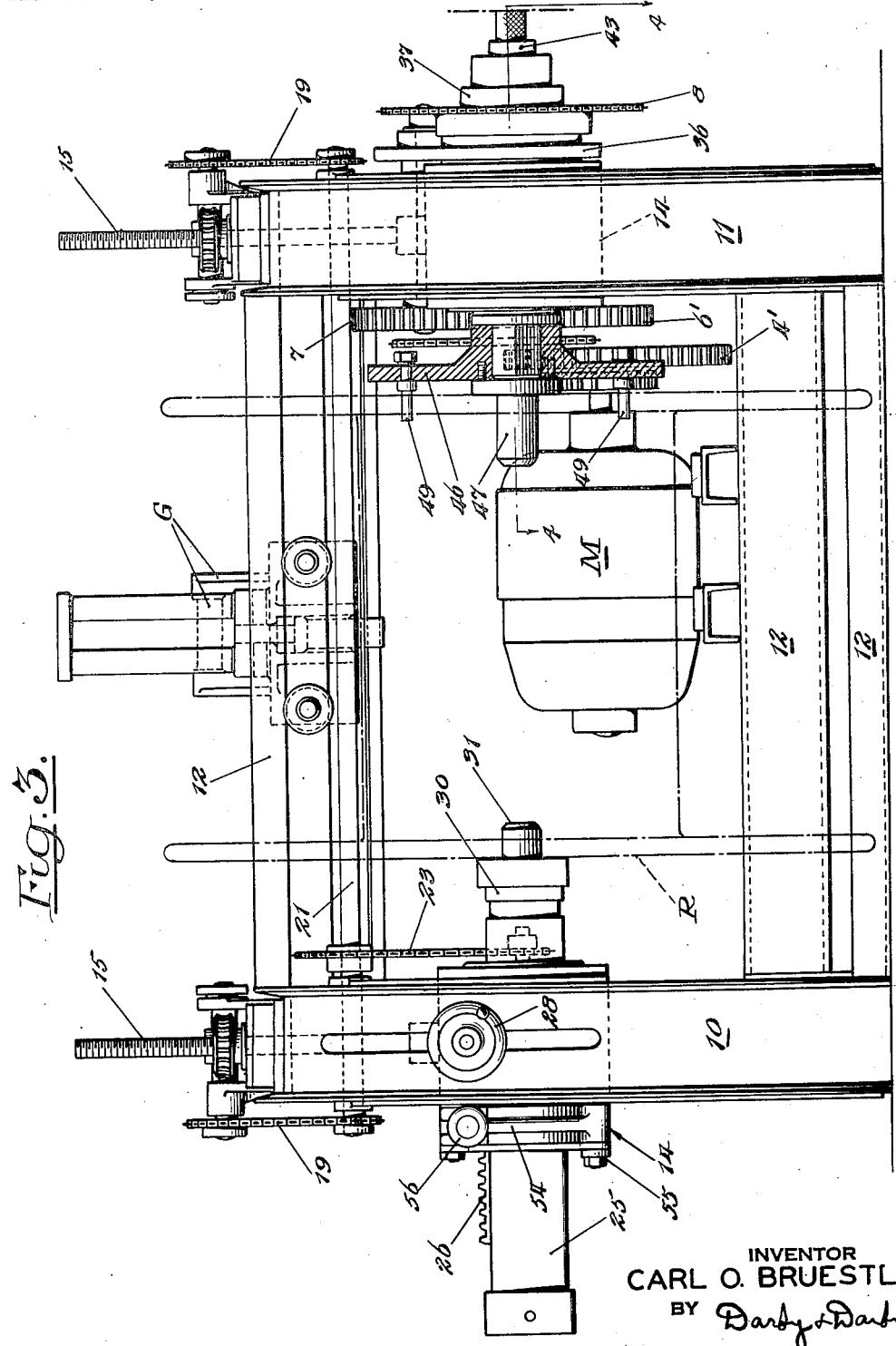
Figure 3 is a front end elevational view thereof taken in the direction of line 3 of Figure 1.
Figure 5:
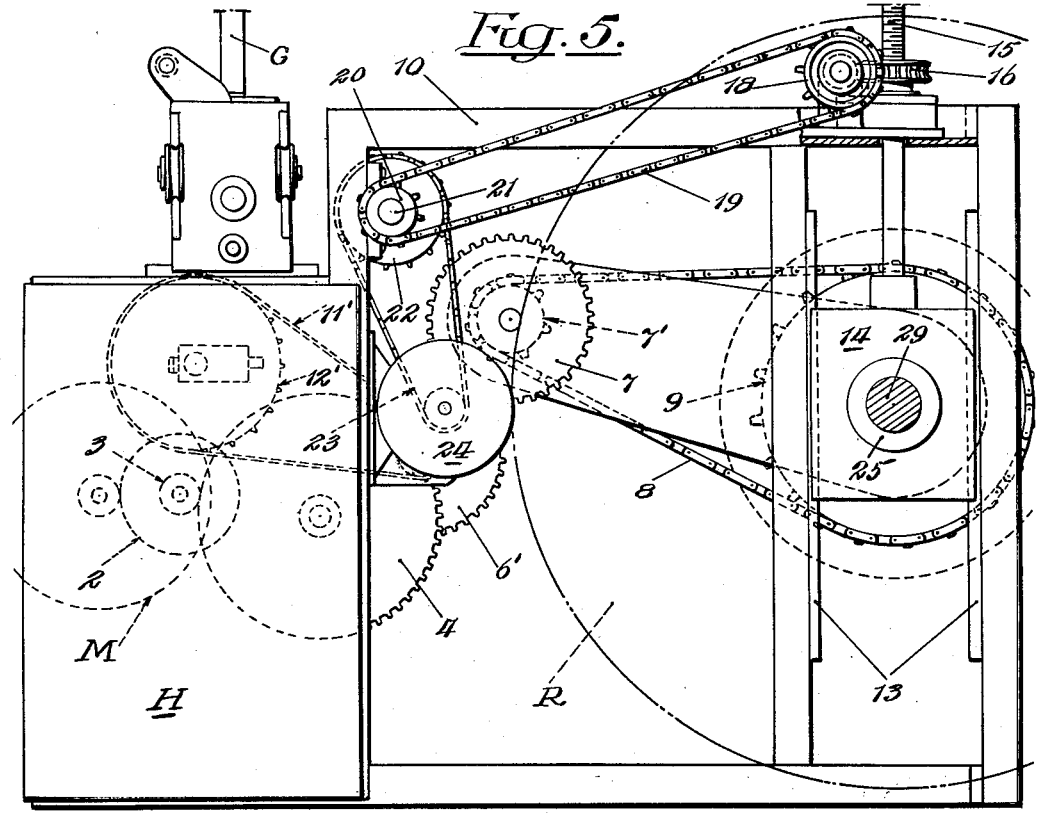
Figure 5 is a lefthand elevational view of the machine taken at line 5—5 of the drawing in Figure 1.
Figure 6:
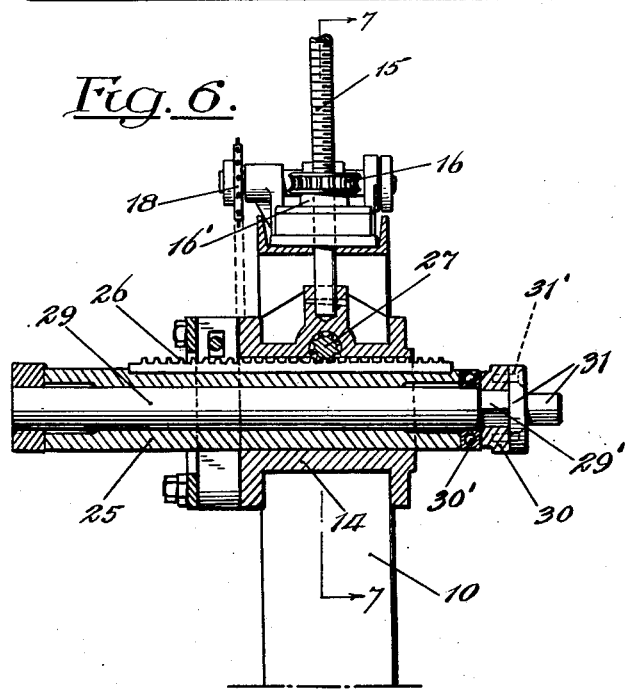
Figure 6 is a longitudinal, central, cross-sectional view of the lefthand stub shaft adjusting mechanism taken on line 6—6 of Figure 1.
Figure 7:
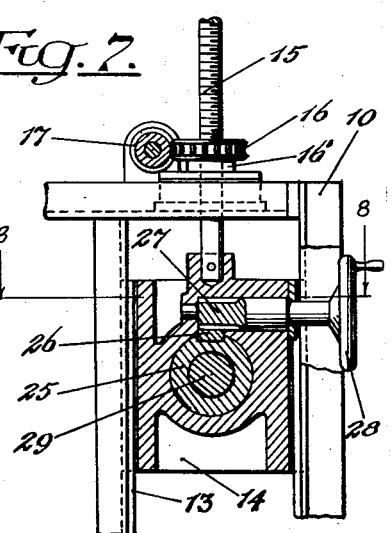
Figure 7 is a cross-sectional view taken at right angles to that of Figure 6 taken along the line 7—7 in Figure 6, further illustrating the mechanism for longitudinally adjusting this stub shaft.

As illustrated, the frame of the machine comprises a pair of upright parallel generally rectangular frames formed of channel members secured together in rectangular configuration in any suitable manner and transversely braced into a rigid structure by means of a plurality of cross braced angle bars 12. An examination of Figures 1, 2, 3 and 5 clearly illustrates the details of this structure. The base channels of the rectangular frameworks extend rearwardly, as is clear from Figures 2 and 5, upon which is mounted a housing H for the main drive motor M, and on which is supported the transversing guide G, which travels on threaded shaft GD and its associated driving mechanism by means of which the cable is laid onto the reel in uniform layers. This part of the mechanism forms no part of this invention and no further reference will be made thereto.

Figure 4:
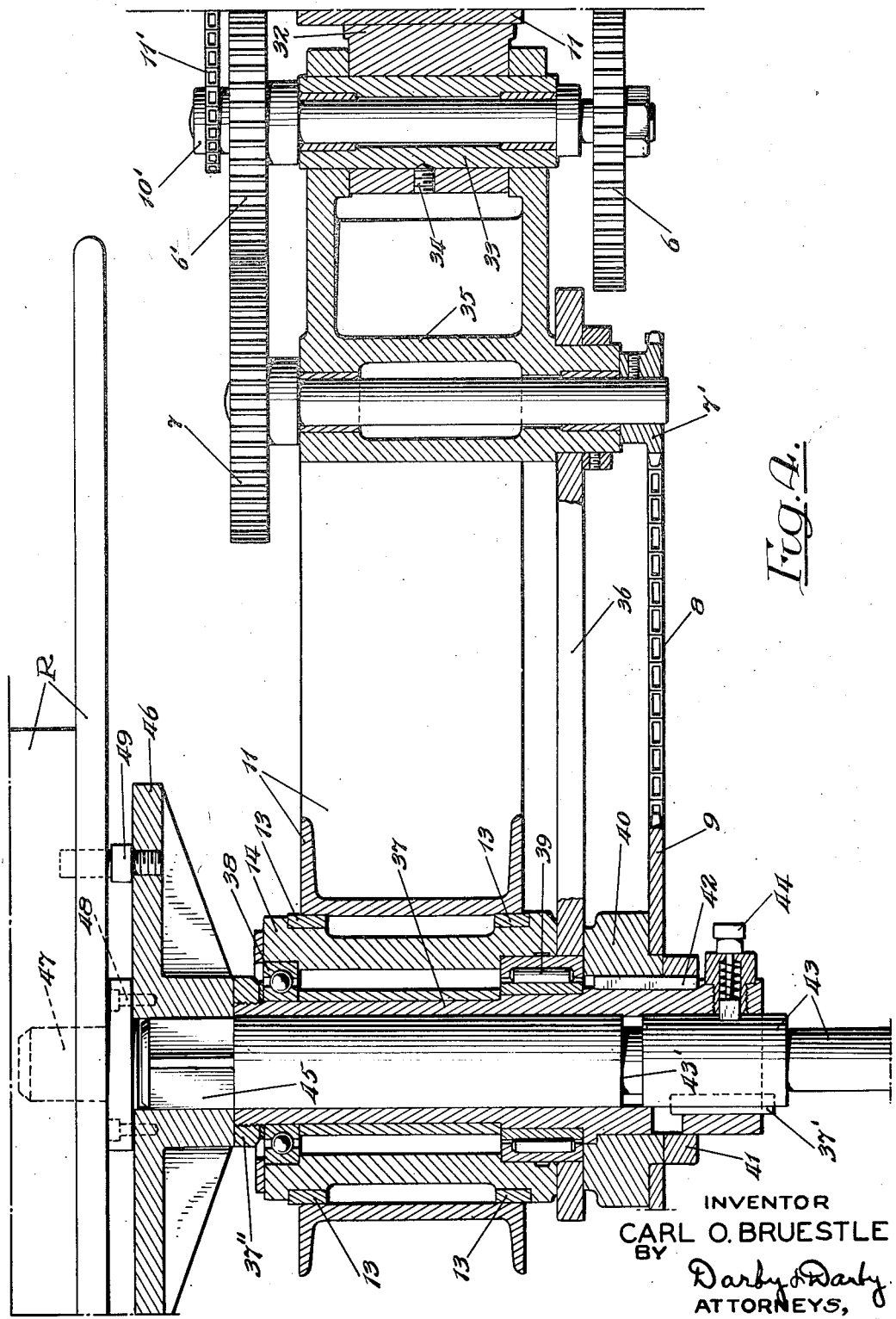
Figure 4 is a longitudinal, central, cross-sectional view through the mechanism by means of which adjustment of the machine for various reel sizes may be effected without disturbing the power transmission mechanism.

Each of the rectangular frameworks includes a pair of vertically extending parallel channel members upon the proposed faces of which are mounted the four guide rails 13, disposed at the corners of an imaginary rectangle, as is particularly clear from Figure 4. Mounted on these rails for guided vertical sliding movement are a pair of journal boxes 14, each of which is provided at the top with a threaded shaft 15, see particularly Figures 2, 5, 6 and 7, which shafts are pinned thereto so as to be nonrotatable. The threaded shafts 15 are engaged by threaded nuts 16 provided with teeth to form wormwheels. These wormwheels are rotatably mounted on thrust bearings 16' and are engaged by worms 17 which are secured to transverse shafts, see Figure 1, journaled on the tops of the frames. Each of these shafts is provided with a sprocket wheel 18, see Figure 2, which is driven by means of chains 19 from sprocket wheels 20 secured to shafts 21 journaled on the frames 10 and 11. As is clear from Figure 1, the shaft 21 extends throughout the width of the machine and is journaled at its ends on the frames. The shaft 21 is provided with a driving sprocket 22, see Figure 5, which is connected by a chain 23 to a sprocket attached to the shaft of the small driving motor 24 mounted on the frame 10.

The main power transmission for rotating the reel stub shafts comprises the main motor M, the shaft of which is provided with a driving sprocket 1. This sprocket meshes with a gear wheel 2, see Figures 1 and 2, mounted on a shaft on the other end of which is attached the pinion 3. Pinion 3 meshes with a gear wheel 4 attached to a shaft journaled on the frame 11, on the other end of which is secured the pinion 5. Pinion 5 meshes with the gear wheel 6 secured to a shaft on the other end of which is secured the gear wheel 6' of the same diameter as the gear wheel 6. The shaft for these gear wheels is journaled in a sleeve 33 which is locked into the supporting arm 32 by means of a set screw 34, see Figure 4. The arm 32 is rigidly attached to the adjacent portion of the frame 11. Gear 6' meshes with a gear 7 attached to a shaft on the other end of which is secured a sprocket wheel 7'. This shaft is journaled in a casting 35 forming a link pivotally supported on the projecting ends of the sleeve 33, see Figure 4. Sprocket wheel 7' is connected by drive chain 8 to a large sprocket wheel 9 which is secured to a collar 40 forming part of a sleeve 37 journaled in the journal box 14 on the ball bearing 38 and the roller bearing 39. A link 36 pivotally connects the casting 35 with the bearing 39 so that the link 36 can pivot on the axes of the shaft of gear 7 and sprocket 7' and the sleeve 37. A collar 42 is pinned to the integral collar 40 of sleeve 37 by means of a pin 42, as clearly shown in Figure 4. Slidably mounted in the sleeve 37 is a shaft 43 which is splined to the sleeve by means of a key 37' and may be locked in one position by means of a spring loaded latch pin 44. The shaft 43 is provided with an annular slot 43' which can be engaged by the latch pin 44 when it is withdrawn and the shaft 43 pulled outwardly. When the latch pin 44 engages the slot 43' the square end 45 of shaft 43 is just withdrawn within the end of the sleeve 37. The sleeve 37 is provided with a threaded collar 37" at its outer end to form a thrust collar for the sleeve. The shaft 43 is provided with a key 37' secured thereon and sliding in a keyway in the base of sleeve 37.

The construction of the stub shaft support at the other side of the machine is best shown in Figures 6, 7, 8 and 9. Slidably mounted in the journal box 14 is a sleeve 25 provided with a toothed rack 26 on its top side, which also acts as a key to prevent rotation of the sleeve 25. Journaled in the journal box 14 is a pinion 27, the shaft of which extends exteriorly through a vertical slot in the front channel of the frame 10, see Figure 5, and is provided with a handwheel 28 for rotating it. Rotatably mounted in the sleeve 25 is a shaft 29 having a squared end 29' on which a collar 30 can be impaled. A thrust bearing 30' is mounted between the sleeve 25 and the collar 30. The stub shaft 31 is provided with a flange so that it may be detachably secured to the collar 30 by means of screws 31'. Secured to the outer face of the journal box 14, in any suitable manner, are a pair of clasp arms 54 pivotally attached to the journal box at 55. These clasp arms encircle the sleeve 25 and their outer ends are engaged by means of a threaded shaft and handwheel 56 for drawing them together in gripping relation about the sleeve 25.

Returning to Figure 4, it will be noted that the other stub shaft 47 is provided with an integral collar by means of which it is detachably secured by means of screws 48 to a double ended lever 46 which fits on the squared end 45 of shaft 43. The arms of the lever 46 are provided with dogs 49 adapted to engage apertures in the reel.

The structure of Figures 10 and 11 will be briefly described, noting that they illustrate accessories by means of which the machine may be adapted to handle narrow reels and use a light arbor. In this arrangement the stub shaft 47 and its collar are removed and replaced by means of a plain collar 50 which can be secured to the double-ended lever 46 by means of the same screws 48. The collar 50 has a central aperture to receive the end of a light arbor 51 on which the reel R is mounted, and at which time it is engaged by the dogs 49. A collar and lock screw 53 are mounted on the shaft for engaging the opposite side of the reel to hold it in proper axial position. The other end of the arbor 51 fits into a flanged collar 52 which can be secured to the flanged collar 30 by means of the same set screw 31' previously used for the stub shaft 31.

In the operation of this machine for handling wide reels without an arbor, the double-ended lever 46 is mounted on the reel so that the stub shaft 47 fits in its central aperture and the dogs 49 lock in the driving holes of the reel. The stub shaft 31 is withdrawn by releasing the clasp arms 54 and rotating the handwheel 28 in a clockwise direction (Fig. 3) to move the sleeve 25 to the left a sufficient distance so that the reel can be reeled into place. At this time the shaft 43, see Figure 4, is withdrawn so that its squared end is inside the sleeve 37. This operation can be effected by releasing the latch 44 and pulling the shaft 43 outwardly. The journal boxes 14 are raised or lowered into alignment with the axis of the reel in an obvious manner by energizing the motor 24 to rotate the nuts 16. As these nuts revolve they react on the threaded shafts 15 to raise or lower the journal boxes, depending upon the direction of rotation of the nuts. When the journal boxes are properly aligned the shaft 43 can be moved back to the position shown in Figure 4, to engage its squared end 45 in the similarly shaped aperture of the lever 46. Hand wheel 28 is rotated in a counterclockwise direction to project the stub shaft 31 into the central hole at the other side of the reel. When these parts are in proper position the clasp arms 54 can be tightened to hold the sleeve in this adjusted longitudinal position. Motor 24 can then be energized in the proper direction to cause the journal boxes 14 to raise and lift the reel free of the floor.

One feature of this invention is the arrangement of the power transmission mechanism for the sleeve 37 to provide its vertical adjustment and the associated bearing block 14 without disconnecting the transmission. By reason of the pivotal link connection 36 between the journal box 14 and the pivoted casting 35 it is possible for those parts to pivot on the axis of sleeve 37, shaft for gear 7 and sprocket 7' and the shaft for gears 6' and 6, so that those parts can pivotally swing about the axis of the shaft for gears 6 and 6', thereby maintaining gear 6' in mesh with gear 7. Likewise the axial distance between the shaft for gear 7 and 7' and sleeve 37 does not change during these adjustments.

The main motor M is now energized which causes rotation of the sleeve 37 through the gear sprocket and general power connection previously described. Shaft 43 is splined to the sleeve 37 so that they rotate together, and thus the reel R is caused to revolve through the dogs 49.

When the reel is loaded it can be lowered to the floor by rotating the nuts 16 in the opposite direction to cause the journal boxes to descend. The clasp arms 54 are released and the sleeve 25 with attached parts withdrawn to disengage the shaft 31 from the reel. Latch pin 44 is retracted and the shaft 43 withdrawn into the sleeve 37 to release the lever 46. The reel can then be rolled out and the lever 46 with attached parts removed from the reel.

When an arbor is used with narrow reels the stub shafts 31 and 47 are removed as previously described and replaced by the collars 50 and 52. It is apparent how the sleeve 25 and shaft 43 can be moved to permit of the attachment of these parts and the engagement of the dogs 49 with the reel. It may be noted that Figure 11 does not add much to the disclosure since its only distinction over the disclosure of Figure 10 is that it shows a wooden reel mounted on the arbor in place of the metal reel (Fig. 10).

From the above description it will be apparent to those skilled in the art that the features of improvement herein disclosed are capable of some physical variation without change in the novel substance of the improvements. I do not, therefore, desire to be limited to the disclosure but rather by the claims granted me.

What is claimed is:

1. In a cable reeling take-up machine, a combination for receiving an empty reel, grasping it, moving it into loading position and then returning it, the improvement comprising a supporting framework, a pair of journal boxes mounted in said framework along the axis corresponding essentially to the axis of a cable reel to be received, said boxes being in spaced relation and mounted for vertical sliding movement, power means for effecting simultaneous movement of said journal boxes, a stub shaft rotatably mounted in one of said journal boxes in fixed position such that said power means effects simultaneous movement of said journal boxes substantially perpendicular thereto and having associated therewith driving dogs for engaging a cable reel slipped onto said stub shaft, a power transmission for driving said stub shaft in any of its vertical positions, a second stub shaft aligned axially with said first stub shaft and means for slidably mounting said second stub shaft in place holding said cable reel, said cable reel, said stub shaft power transmission including a driven sleeve, a shaft splined therein, and means for detachably securing said shaft to said splined shaft.

2. In the combination in accordance with claim 1, a means for locking the second stub shaft in any desired axial relation comprising a pair of semi-circular grippers pivotally mounted on said journal for adjustable connection.

3. In a cable reeling take-up machine, a combination for receiving an empty reel, grasping it, moving it into loading position and then returning it, the improvement comprising a supporting framework, a pair of journal boxes mounted in said framework along the axis corresponding essentially to the axis of a cable reel to be received, said boxes being in spaced relation and mounted for vertical sliding movement, power means for effecting simultaneous movement of said journal boxes, a stub shaft rotatably mounted in one of said journal boxes in fixed position such that said power means effects simultaneous movement of said journal boxes substantially perpendicular thereto and having associated therewith driving dogs for engaging a cable reel slipped onto said stub shaft, a power transmission for driving said stub shaft in any of its vertical positions, a second stub shaft aligned axially with said first stub shaft and means for slidably mounting said second stub shaft in place holding said cable reel, said stub shaft power transmission including a power driven sleeve rotatably mounted in the associated journal box, a shaft slidably mounted in said sleeve and splined thereto, means for locking said shaft in either of two axial positions, and means for detachably securing the stub shaft to said splined shaft.

4. In a cable reeling take-up machine, a combination for receiving an empty reel, grasping it, moving it into loading position and then returning it, the improvement comprising a supporting framework, a pair of journal boxes mounted in said framework along the axis corresponding essentially to the axis of a cable reel to be received, said boxes being in spaced relation and mounted for vertical sliding movement, power means for effecting simultaneous movement of said journal boxes, a stub shaft rotatably mounted in one of said journal boxes in fixed position such that said power means effects simultaneous movement of said journal boxes substantially perpendicular thereto and having associated therewith driving dogs for engaging a cable reel slipped onto said stub shaft, a power transmission for driving said stub shaft in any of its vertical positions, a second stub shaft aligned axially with said first stub shaft and means for slidably mounting said second stub shaft in place holding said cable reel, said stub shaft power transmission including a power driven sleeve rotatably mounted in the associated journal box, a shaft slidably mounted in said sleeve and splined thereto, means for locking said shaft in either of two axial positions, a plate detachably mounted on said splined shaft having reel engaging dogs, and a stub shaft detachably secured to said plate.

5. In a cable reeling take-up machine, a combination for receiving an empty reel, grasping it, moving it into loading position and then returning it, the improvement comprising a supporting framework, a pair of journal boxes mounted in said framework along the axis corresponding essentially to the axis of a cable reel to be received, said boxes being in spaced relation and mounted for vertical sliding movement, power means for effecting simultaneous movement of said journal boxes, a stub shaft rotatably mounted in one of said journal boxes in fixed position such that said power means effects simultaneous movement of said journal boxes substantially perpendicular thereto and having associated therewith driving dogs for engaging a cable reel slipped onto said stub shaft, a power transmission for driving said stub shaft in any of its vertical positions, a second stub shaft aligned axially with said first stub shaft and means for slidably mounting said second stub shaft in place holding said cable reel, said stub shaft power transmission including a gear train characterized in that one driving gear is rotatably mounted on a fixed axis and a meshing driven gear is pivotally mounted on the axis of said first gear, and a link pivotally interconnecting said second gear with said first journal box.

CARL O. BRUESTLE.

References Cited in the file of this patent

UNITED STATES PATENTS

| Number | Name | Date |
|---|---|---|
| 1,025,376 | Craig | May 7, 1912 |
| 1,086,722 | Langston | Feb. 10, 1914 |
| 1,544,557 | Coldwell | July 7, 1925 |
| 1,722,508 | Stone | July 30, 1929 |
| 1,812,742 | Fallot | June 30, 1931 |
| 1,818,720 | Lamatsch | Aug. 11, 1931 |
| 1,825,218 | Van Hook | Sept. 29, 1931 |
| 1,836,815 | Reeves | Dec. 15, 1931 |
| 1,960,452 | Parsons | May 29, 1934 |
| 2,095,019 | Wood | Oct. 5, 1937 |
| 2,163,010 | Richards et al. | June 20, 1939 |
| 2,363,112 | Bennett | Nov. 21, 1944 |